(12) United States Patent
Haas

(10) Patent No.: US 11,186,466 B2
(45) Date of Patent: Nov. 30, 2021

(54) LIFTING DEVICE WITH SHACKLE DROP BRAKE

(71) Applicant: RUD KETTEN RIEGER & DIETZ GMBH U. CO. KG, Aalen (DE)

(72) Inventor: Simon Haas, Horn (DE)

(73) Assignee: RUD KETTEN RIEGER & DIETZ GMBH U. CO. KG, Aalen (DE)

( * ) Notice: Subject to any disclaimer, the term of this patent is extended or adjusted under 35 U.S.C. 154(b) by 43 days.

(21) Appl. No.: 16/540,462

(22) Filed: Aug. 14, 2019

(65) Prior Publication Data
US 2020/0055712 A1    Feb. 20, 2020

(30) Foreign Application Priority Data

Aug. 16, 2018  (DE) .................. 10 2018 213 825.7

(51) Int. Cl.
| | | |
|---|---|---|
| *B66C 1/16* | (2006.01) | |
| *B66C 13/06* | (2006.01) | |
| *B66C 1/66* | (2006.01) | |
| *F16D 65/09* | (2006.01) | |
| *F16D 59/02* | (2006.01) | |

(52) U.S. Cl.
CPC ............... *B66C 13/06* (2013.01); *B66C 1/16* (2013.01); *B66C 1/66* (2013.01); *F16D 59/02* (2013.01); *F16D 65/09* (2013.01)

(58) Field of Classification Search
CPC .. B66C 13/06; B66C 1/16; B66C 1/66; F16D 65/09; F16D 59/02
USPC ............................ 294/215, 89, 82.28; 403/78
See application file for complete search history.

(56) References Cited

U.S. PATENT DOCUMENTS

| | | | | | |
|---|---|---|---|---|---|
| 4,671,554 | A | * | 6/1987 | Lancelot | ................ B66C 1/666 294/82.24 |
| 4,705,422 | A | * | 11/1987 | Tsui | ........................ B66C 1/66 294/215 |
| 5,961,241 | A | * | 10/1999 | Haker | ................... B60P 7/0807 403/155 |
| 6,032,993 | A | * | 3/2000 | Kwon | ...................... B66C 1/66 294/215 |

(Continued)

FOREIGN PATENT DOCUMENTS

| | | |
|---|---|---|
| DE | 29718318 U1 | 3/1998 |
| DE | 29911871 U1 | 9/1999 |

OTHER PUBLICATIONS

Office Action from German counterpart Application No. 10 2018 213 825.7, dated Dec. 5, 2019, 18 pages.

*Primary Examiner* — Paul T Chin
(74) *Attorney, Agent, or Firm* — Edell, Shapiro & Finnan, LLC

(57) ABSTRACT

A lifting device includes a base part, a connecting part, and at least one shackle drop brake. The base part attaches to an object, such as a loading platform or a load. The connecting part serves to attach a sling, lifting, lashing or tensioning means and is pivotable about a swivel axis relative to the base part. The base part also has a bearing surface which defines an assembly plane. The shackle drop brake acts between the base part and the connecting part. The shackle drop brake has at least one holding point configured to hold a weight of the connecting part when the connecting part is in a swivel position that is angled with respect to a vertical axis extending from the assembly plane.

15 Claims, 2 Drawing Sheets

(56) References Cited

U.S. PATENT DOCUMENTS

| | | | |
|---|---|---|---|
| 6,547,474 B1* | 4/2003 | Smetz | B60P 7/0807 |
| | | | 403/150 |
| 7,036,858 B2* | 5/2006 | Buck | B66C 1/66 |
| | | | 294/215 |
| 9,302,889 B2* | 4/2016 | Bateman | B66C 13/16 |
| 2004/0032134 A1* | 2/2004 | Hageman | B66C 1/66 |
| | | | 294/215 |
| 2005/0069379 A1* | 3/2005 | Smetz | B66C 1/66 |
| | | | 403/164 |

\* cited by examiner

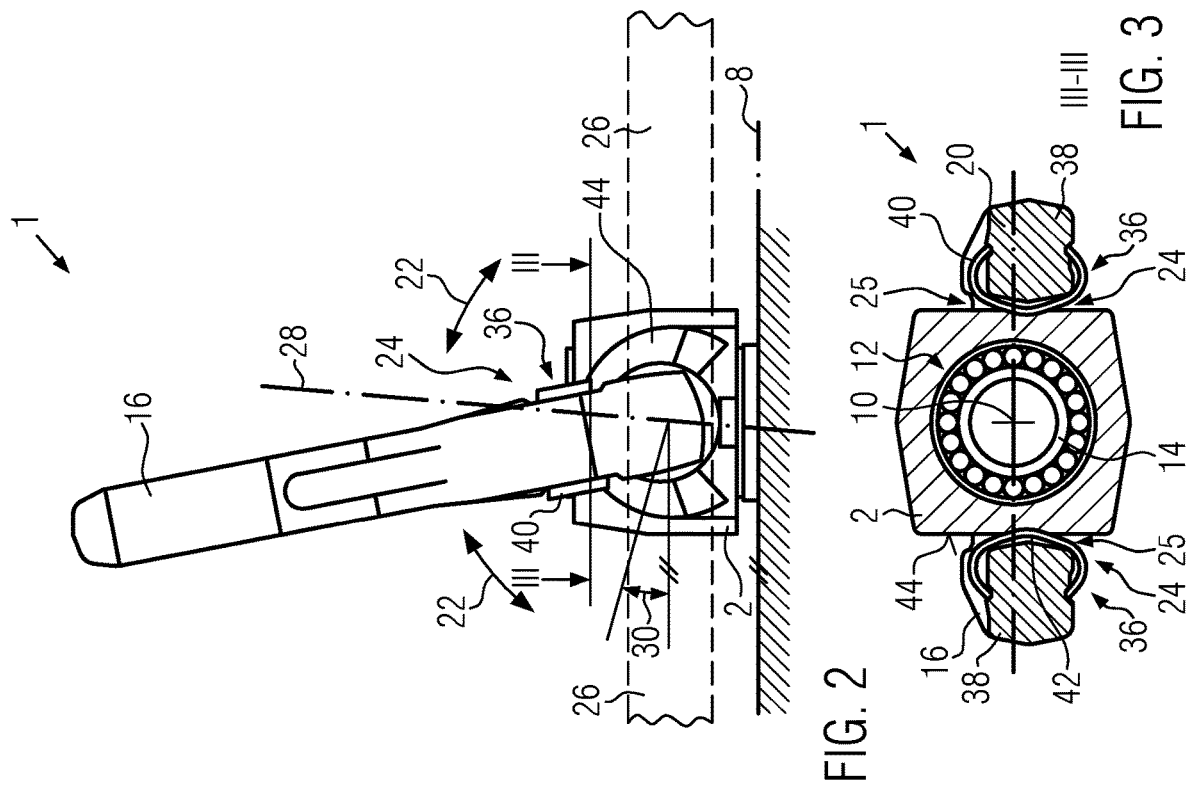
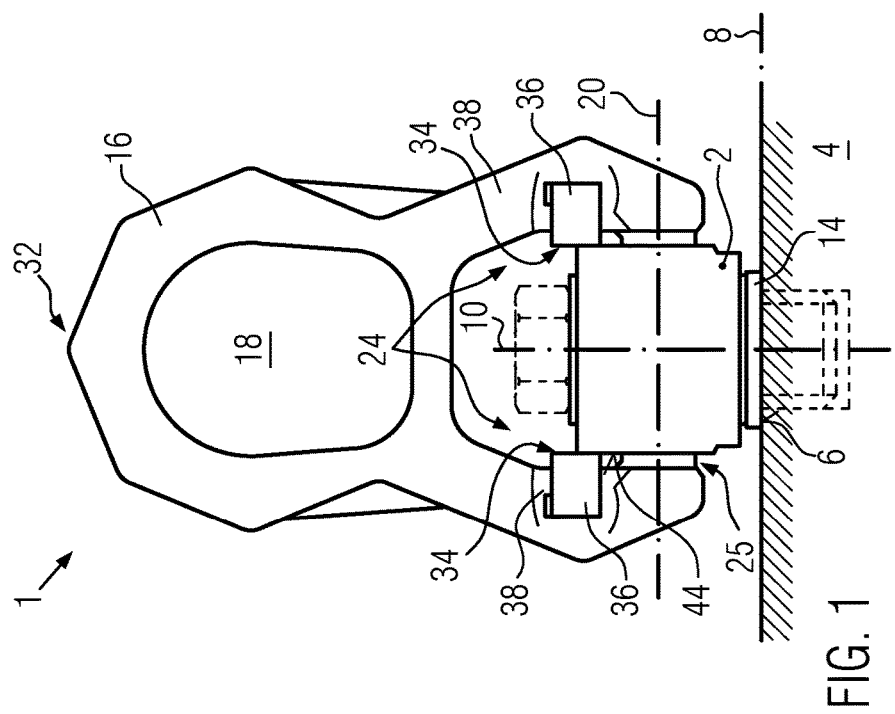

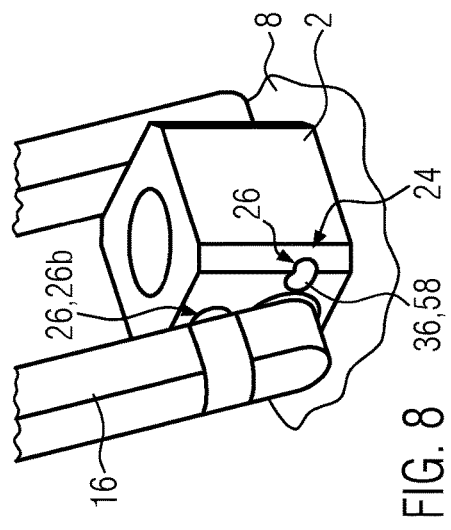
FIG. 4
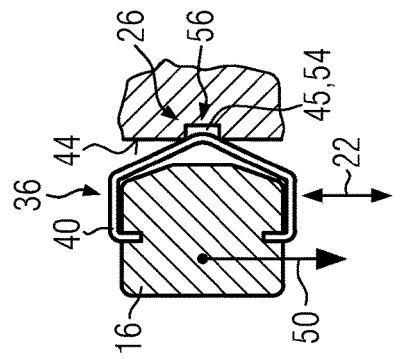
FIG. 6
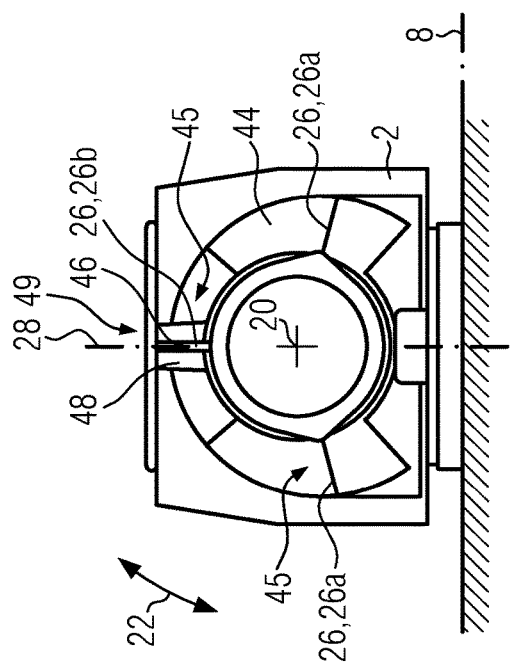
FIG. 5
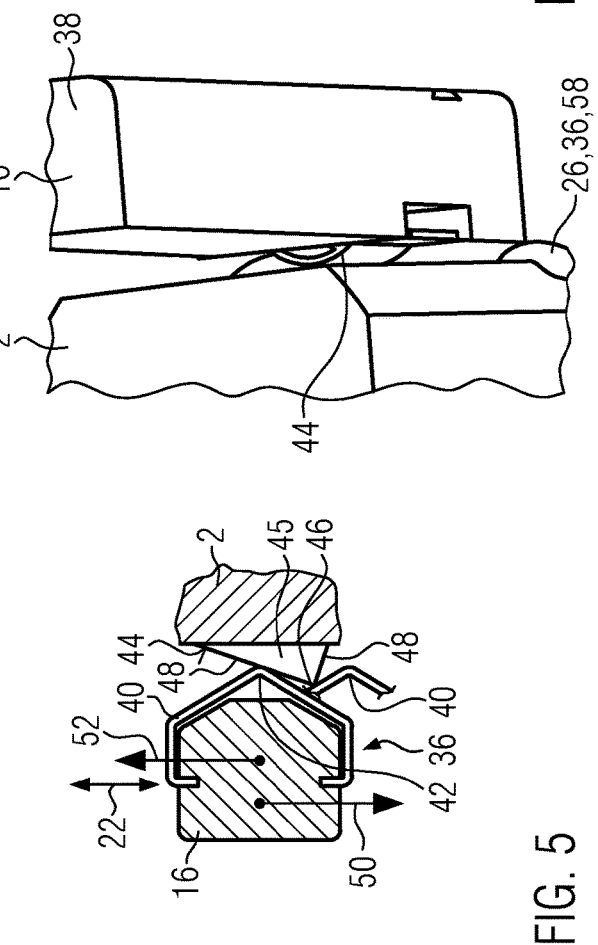
FIG. 7
FIG. 8

LIFTING DEVICE WITH SHACKLE DROP BRAKE

CROSS-REFERENCE TO RELATED APPLICATIONS

This application claims priority to German Patent Application No. 10 2018 213 825.7 filed on Aug. 16, 2018, the entire contents of all of which are incorporated by reference herein.

BACKGROUND

The invention refers to a lifting device with a base part for attachment to an object, such as a loading platform or a load, and with a connecting part held on the base part for attachment of a sling, tensioning, lashing or lifting means, wherein the base part has at its end remote from the connecting part a bearing surface defining an assembly plane for resting on the object and the connecting part is pivotable about a swivel axis relative to the base part in the direction towards and away from the assembly plane.

Such lifting devices are well known. The base part is attached, for example, to a load, such as a container, or a loading platform of a vehicle. To lift the container, for example, a sling, such as a hook attached to a chain or belt, is hooked into the connecting part. To lash a load to the loading platform, a lashing means, such as a chain or a belt, is attached to the connecting part.

The connecting part can be swiveled relative to the base part so that it can automatically align itself along the force applied by the sling, lifting, lashing or tensioning means. In addition, the base part can be rotated relative to the object about an axis of rotation perpendicular to the assembly plane in order to enable even better alignment of the connecting part in the load direction.

SUMMARY

The object of the present invention is to improve the manageability of such lifting devices.

For the lifting device mentioned above, this object is achieved in accordance with the invention by at least one shackle drop brake acting between the base part and the connecting part and having at least one holding point, wherein at the holding point the connecting part is held at a distance from the assembly plane at least under its own weight outside the perpendicular to the assembly plane. Thus, the shackle drop brake prevents the connecting part from resting on an object to which the base part is attached. This makes the connecting part easier for a user to grip and lift. In addition, injuries and damage are avoided because, for example, parts can no longer be trapped between the object to which the base part is attached and the connecting part.

This simple solution makes it easier for a user to handle the connecting part because at the holding point he can reach between the connecting part and the assembly plane and lift the connecting part more easily. In addition, it can hook a sling, tensioning, lashing or lifting means directly into the connecting part held at the holding point, as the connecting part is spaced from the assembly plane and the sling, tensioning, lashing or lifting means can be threaded through the gap between the connecting part and the assembly plane.

The following describes the invention's further developing features. The individual features can be combined with each other independently of each other and are advantageous for themselves.

For example, in accordance with a particularly advantageous design, the shackle drop brake can have a second holding point. The second holding point is preferably arranged symmetrically with respect to the perpendicular to the first holding point, so that the connecting part is held on both sides of the swivel movement by the shackle drop brake.

At at least one holding point, the braking or holding force applied by the shackle drop brake is preferably greater than the counter-directional weight force of the connecting part.

At the holding point, the connecting part may be held at least approximately parallel or at an acute angle to the assembly plane. In particular, the connecting part may include an acute angle of less than 30°, in particular less than 10°, with the assembly plane at at least one holding point. In order not to stand too far away from the assembly plane and thus not to obstruct it unnecessarily, the connecting part can be closer to the assembly plane at the holding point with its end facing away from the base part than with its area closer to the base part. However, this can make manual intervention or direct attachment of the lifting, lashing, tensioning and sling means more difficult.

The swivel axis of the connecting part is preferably parallel to the assembly plane in order to enable alignment in the direction of the force exerted on the connecting part by the lifting, sling, lashing or tensioning means. As already mentioned above, the base part can be rotated around an axis of rotation perpendicular to the assembly plane when mounted on the object.

The connecting part has an opening for the insertion of the lifting, sling, lashing or tensioning means. The opening can span a plane, inclined or curved opening plane, the position of which relative to the assembly plane can determine the orientation of the connecting part. If the connecting part is aligned perpendicular to the assembly plane, the opening plane is therefore perpendicular to the assembly plane.

According to another advantageous design, the bracket drop brake can have a braking force that increases with the swivel movement of the connecting part towards a holding point and/or, at least in sections, towards the assembly plane. The braking force is directed in the opposite direction to a force swiveling the connecting part. In this design, for example, a gradual braking takes place when the shackle falls under the influence of gravity. A potentially dangerous rebound of the connecting part from the holding point can be avoided by gradually increasing the braking force. In one variant, the braking force can increase to varying degrees, depending on which side the connecting part approaches the (respective) holding point from. The exact position of the holding point may depend on the magnitude of the force swiveling the connecting part. The holding point is at the point where the holding or braking force and the swiveling force cancel each other out.

A holding point can at the same time form a latching point at which a snap action takes place. Such a snap action is characterized, for example, by the fact that the braking force changes abruptly when the holding point is passed. An abrupt change can be realized by an essentially discontinuous change and/or a change of a braking force increasing towards the latching point with the swivel movement into a decreasing braking force after passing the latching point, i.e. by a braking force changing its direction.

Along the swiveling movement, the connecting part can be latched to at least one, preferably a plurality of latching points. The latching point can be used as a holding point. For example, latching points can be present at an acute angle to the assembly plane.

In a further advantageous design, the shackle drop brake may have at least one spring arrangement which is deflected more strongly at the at least one holding point and/or the at least one latching point than at at least one point spaced from the holding point. In particular, the spring arrangement can generate the braking force acting on the connecting part by friction, for example.

If the braking force increases in the swivel direction towards the holding point, the spring arrangement may be increasingly deflected over a range of the swivel movement of the shackle towards the holding point and/or towards the latching point. The range of increasing deflection may end at the holding point and/or at a latching point so that when a sufficiently large force is applied, the connecting part can be moved over the holding point or latching point. Such a movement beyond the holding point and/or the latching point is useful, for example, if the lifting device is located near an edge of the object and thus has a swivel range of more than 225°. The increase of the deflection of the spring arrangement can be different on both sides of a latching point.

The spring arrangement can also be moved with the connecting part. With this design, the spring arrangement is swiveled with the connecting part. Alternatively, the spring arrangement can also be arranged stationary on the base part. A design with a plurality of spring arrangements is also possible in which at least one spring arrangement moves with the connecting part and at least one other spring arrangement is stationary with the base part.

In a spring arrangement which moves with the connecting part, the spring arrangement may have at least one spring which at least partially engages around the connecting part, in particular one leg of the connecting part. Such a design allows the spring to be fitted without mechanical weakening of the connecting part. The spring can, for example, be a yoke spring or a clamp spring. A resilient pressure piece such as a ball pressure pin, a locking pin or a ball locking pin can also be provided.

The shackle drop brake may also have a braking or friction surface which preferably extends at least in sections around the swivel axis. The arrangement around the swivel axis allows a simple design of the shackle drop brake. The friction surface can in particular interact with the spring arrangement, for example by generating a braking force on the friction surface. For this purpose, the friction surface can be opposite the spring arrangement. The number of friction surfaces preferably corresponds to the number of spring arrangements. Each spring arrangement is preferably assigned a friction surface. The braking force is generated preferably by the deflection of the spring arrangement generating a friction force at the friction surface which brakes the swivel movement of the connecting part, for example by the spring arrangement pressing against the friction surface. In particular, there may be two friction surfaces at opposite points of the swivel axis with respect to the axis of rotation of the base part.

The at least one friction surface can be arranged on the connecting part or on the base part. Of course, there can also be at least one friction surface on the connecting part and at least one friction surface on the base part. However, it is preferable for the friction surface to be located on the base part, as the connecting part is more critical in terms of strength and abrasion can lead to reduced strength.

The shackle drop brake, in particular a friction surface, is preferably located in at least one gap between the base part and the connecting part. Preferably, a friction surface is located on an outer surface of the base part opposite the connecting part.

The spring arrangement is preferably in contact with the friction surface, at least if the connecting part is at and/or close to a holding point and/or a latching point. For contact with the friction surface, the spring arrangement may have a friction element arranged between the spring and the friction surface. Alternatively, the spring can also rest directly on the friction surface. In another variant, the friction surface itself can be resilient. In a further configuration, the spring of the spring arrangement may have a bending point which lies opposite the friction surface and presses against the friction surface at least at the holding and/or the latching point. The location at which the spring assembly rests against the friction surface may be formed by a projection having two straight flanks inclined to the friction surface, whether or not supported by a spring or a friction member.

The spring is designed in such a way that it can be deflected perpendicular to the swivel movement. Alternatively or additionally, the spring can be arranged to be deflectable in the swivel direction. The latter design allows the spring deflection to generate a restoring force directly opposed to the swivel movement. A restoring force can also be generated by deflecting the friction surface if the friction surface has a stronger inclination than the friction cone.

The friction surface can approach the spring arrangement along the swivel movement of the connecting part or the spring arrangement on the connecting part towards the holding point and/or the latching point. For example, the friction surface may be a surface gradually protruding from the base part or from the connecting part in the direction around the swivel axis towards the spring assembly, for example bead-shaped, wedge-shaped, progressive or degressive.

In a further design, the connecting part can be latched to at least one holding point. For this purpose, the friction surface may have at least one latching structure, for example a latching recess or a latching projection, which cooperates with the spring arrangement. In a further design, such a latching can also only take place when the holding point is passed. For example, the connecting part can be latched in a position in which it rests on the assembly plane. The latching structure is preferably located at a point where the connecting part is at a latching point.

A spring arrangement on the base part side of the base can be arranged at a point where the connecting part is located at the holding point and/or the latching point, especially if the spring arrangement is a resilient pressure piece. At this point, a latching structure on the connecting part side can then interact with the spring arrangement to latch the connecting part into place at the latching point and thus hold it in place.

If a plurality of latching points are provided along the swivel movement of the connecting part, a separate latching structure is preferred for each latching point. Alternatively or additionally, a separate spring arrangement can be provided for each latching point and/or each holding point. For example, there may be a resilient pressure piece at each of the different latching points. Depending on the type of desired fixing of the connecting part at a latching point, different latching structures can interact with the spring arrangement at different latching points. For example, a latching recess can be used to snap into place at the latching point. With a latching projection, on the other hand, the spring arrangement gradually runs onto the flanks of the latching projection so that the connecting part is held without a latching process. If the latching projection is passed, a snap-over occurs with such a design.

In general, the shackle drop brake can have an inhibitor or detent (German: "Gehemme") and/or a locking mechanism and the connecting part can be held frictionally, positively and/or non-positively at at least one holding point and/or at least one latching point. In the case of an inhibitor or detent, the connecting part can be swiveled beyond the holding point when a force acting in the swiveling direction is applied which exceeds the braking force acting at the holding point. The spring arrangement and/or the friction surface may be part of such an inhibitor or detent and/or locking mechanism. Whether there is an inhibitor or detent or a locking mechanism depends on the design of the spring arrangement and friction surface and the resulting form or frictional connection.

In the case of a locking mechanism with a form-fit mounting, the connecting part can be locked to the base part at the latching point, whereby the latching can be non-positive, i.e. can be overcome by a force which in turn exceeds the holding or braking force. However, in one variant the connecting part can also be locked at the holding point. Then the locking mechanism must first be released before the connecting part can be moved away from the holding point.

In another advantageous design, the shackle drop brake can be used to prevent the lifting device from turning dangerously under load during operation. Such a reversal occurs if the lifting device is incorrectly aligned when the load is applied and this incorrect alignment is temporarily stable due to the load direction. In such a case, the connecting part can suddenly align itself in the direction of the force as the force acting on the lifting device increases. This leads to a jerky movement of the load and to load peaks which can damage the load, the lifting device and the sling, lifting, lashing and tensioning means.

Such a reversal can be reliably avoided if the connecting part cannot be aligned perpendicular to the assembly plane when it is not under load.

Using the shackle drop brake, such an alignment in an advantageous configuration can be avoided by providing at least one latching point at which the connecting part snaps around, in that a deflecting force directed away from the latching point acts on the connecting part on both sides of the latching point. The force of rejection rejects the connecting part from the latching point. The rejection point is therefore "avoided" by the connecting part. The position of the connecting part at the rejection point is unstable. Such a latching point can, for example, have a latching structure in the form of a projection over which the spring arrangement snaps, so that the connecting part can only be fixed at the point of deflection using considerable force. It is particularly advantageous if the connecting part is aligned perpendicular to the assembly plane at this latching point.

BRIEF DESCRIPTION OF THE DRAWINGS

In the following, the invention is described in more detail on the basis of embodiments with reference to the attached Figures. In the Figures, elements which correspond to each other with regard to structure and/or function are provided with the same reference numerals.

The combination of features shown and described in the individual embodiments is for explanation purposes only. In accordance with the above, a feature of an embodiment may be omitted if its technical effect is not relevant to a particular application. Conversely, in accordance with the above, a further feature may be added to an embodiment if its technical effect is advantageous or necessary for a particular application.

FIG. 1 shows a front view of an embodiment of an invention of a lifting device;

FIG. 2 shows a side view of the embodiment of FIG. 1;

FIG. 3 shows a view of the sectional plane III-III of FIG. 2;

FIG. 4 shows a part of the shackle drop brake of the FIG. 2;

FIG. 5 shows a detail of a shackle drop brake;

FIG. 6 shows another detail of a shackle drop brake;

FIG. 7 shows another embodiment of a shackle drop brake;

FIG. 8 shows another embodiment of a shackle drop brake.

DETAILED DESCRIPTION

First the construction of a lifting device 1 according to the invention 1 is explained using FIGS. 1 to 3, where FIG. 3 shows the section along the line III-III of FIG. 2.

The lifting device 1 has a base part 2, which can be attached, for example screwed, to an object 4, for example a load or a loading platform. To rest on the object 4, the lifting device 1 has a bearing surface 6 against which the base part 2 rests at the object 4. The bearing surface 6 determines an assembly plane 8.

The base part 2 is preferably rotatable around an axis of rotation 10 vertical to assembly plane 8. For example, the base part 2 can have one or more bearings 12 in the form of a rolling or plain bearing, which are then spaced 10 apart in the direction of the axis of rotation. In order to allow the base part 2 to rotate easily on the object 4, an inner bush 14 mounted in the base part 2 can extend beyond the base part 2 and form the support surface 6.

The lifting device 1 also has a connecting part 16 which forms an opening or eye 18 for fastening a sling, tensioning, lashing or lifting means (not shown). The connecting part 16 is held on the base part 2 so that it can be swiveled about a swivel axis 20 relative to the base part 2. As FIG. 1 shows, the swivel axis 20 can run parallel to assembly plane 8.

Due to the swiveling support on base part 2, the connecting part can be swiveled towards and away from assembly plane 8. The swivel movement is indicated by the double arrows 22 in FIG. 2.

The lifting device 1 has a shackle drop brake 24 by means of which the swivel movement 22 of the shackle can be braked or stopped at at least one point, here referred to as holding point 26, preferably at several holding points. The shackle drop brake 24 acts between base part 2 and connecting part 16. It is preferably located in a gap 25 between base part 2 and the shackle or connecting part 16. At at least one holding point 26, the connecting part is preferably held in a swivel position outside a vertical 28 on assembly plane 8. FIG. 2 shows two dashed holding points 26 which are at least approximately symmetrically opposite each other with respect to the vertical 28. At the holding points 26 at least the dead weight of the connecting part 16 is supported.

At at least one holding point 26, connecting part 16 is preferably kept at a distance from assembly plane 8. This can be realized by the fact that at at least one holding point 26 the connecting part 16 or its opening 18 is aligned at least in sections approximately parallel to the assembly plane 8 or lies at an acute, positive or negative angle 30 to the assembly plane 8. For example, with a negative acute angle 30, an end 32 of the connecting part 16 remote from the base part 2 may be closer to assembly plane 8 than an area of the connecting part closer to the swivel axis 20.

The shackle drop brake 24 can have at least one inhibitor or detent and/or locking mechanism 34. By the inhibitor or detent and/or locking mechanism, the connecting part 16 is held at the holding point 26 in a friction-locking, positive-locking and/or force-fit manner. At holding point 26, connecting part 16 and base part 2 can in particular be latched or interlocked.

In the case of a design as an inhibitor or detent, the fixing of connecting part 16 at holding point 26 can be overcome by applying a counterforce overcoming the holding force of the shackle drop brake 24. The connecting part 16 can therefore be moved beyond the holding point 26, for which an additional force must be applied. An interlock must be opened first before moving beyond holding point 26 or out of holding point 26.

The exact position of the holding point along the swivel movement depends on the force that swivels the connecting part. The holding point is formed where the braking and holding force is as great as the pivoting force.

In the version shown in FIGS. 1 to 3 for example purposes only, the shackle drop brake has at least one spring arrangement 36. According to the embodiment shown, there may be two spring arrangements 36 opposite each other with respect to the base part 2.

In principle, a spring arrangement 36 can be arranged either on the base part 2 or on the connecting part 16. In the embodiment of FIGS. 1 to 3, the spring arrangement 36 is located on connecting part 16, in particular on one leg 38 of connecting part 16. The leg 38 extends away from the swivel axis 20 in the direction of the end 32. Connecting part 16 has two such legs 38, each of which is provided with a spring arrangement 36.

The spring arrangement 36 has a shackle-shaped or clamp-shaped spring 40 which partially surrounds one leg 38 and, at least at one holding point 26, rests deflected against the base part 2 or presses against the base part 2. In particular, the spring 40 may have a protruding bending point 42 with which the spring arrangement 36 touches the base part 2 at least at one holding point 26. Instead of a direct contact, a friction element of spring arrangement 36 can also be applied to base part 2. If, for example, the spring arrangement has a resilient pressure piece, the friction element can be a ball or a bolt.

The shackle drop brake 24 also has at least one friction surface 44. The friction surface 44 can extend around the swivel axis 20. One friction surface 44 is preferably assigned to each spring arrangement 36. The spring arrangement 36, for example its bending point 42, can rest against the friction surface 44 at least when the connecting part 16 is located at a holding point 26.

The friction of the shackle drop brake 24, as produced, for example, by the spring 40 pressed against the friction surface 44, brakes the swivel movement 22 of the connecting part 16. Towards at least one holding point, the braking force of the shackle drop brake 24 can increase, for example, if the spring 40 is deflected more strongly at a holding point 26 than at a point further away from the holding point 26. The stronger deflection produces a higher friction force and thus a higher braking force.

Such an increasing braking force can be achieved, for example, by the friction surface 44 approaching the spring arrangement 36 in the direction of holding point 26 or increasingly projecting towards the spring arrangement 36. Thus, the distance between the friction surface 44 and connecting part 16 can be reduced along the swivel movement 22 towards the holding point 26 if the friction surface is located at the base part 2. If the friction surface 44 is located on connecting part 16, the distance between base part 2 and friction surface 44 can be reduced towards a holding point 26. This can be achieved by a friction surface 44 projecting from the base part 2 in the form of a ramp or wedge, as shown in FIG. 2.

If the spring arrangement 34 is on base part 2, the friction surface 44 can be opposite on the connecting part 16. Irrespective of whether the spring arrangement 34 is located at the connecting part 16 or at the base part 2, the spring arrangement 34 and the friction surface 44 preferably lie opposite each other in the gap 25 between the base part 2 and the connecting part 16.

If the braking force at holding point 26 is overcome, the connecting part 16 can be turned further, which is particularly useful if the lifting device 1 is located at one corner of object 4 and thus has a swivel range of over 180 degrees or even over 225 degrees. In such an application, the shackle drop brake 24 prevents the connecting part 16 from falling back beyond the next holding point 26.

In the following, the function of an embodiment of the shackle drop brake 24 is explained in more detail using FIG. 4. FIG. 4 shows the enlarged base part 2 of the version of FIGS. 1 to 3 without the connecting part 16. It can be seen that there are three holding points 26. The two holding points 26a are opposite each other with respect to the base part 2 and hold the not shown connecting part 16 at an acute angle 30 (FIG. 2) or parallel to the assembly plane 8. A holding point 26 at the friction surface 44 does not have to be located where the connecting part 16 is located at the respective holding point. At each holding point 26 the friction surface 44 has a latching structure 45. In FIG. 4 the latching structures 45 are only for example purposes latching projections 46. On closer inspection there may be two slightly spaced holding points on both sides of each latching projection 46 in swivel direction 22, depending on from which side the connecting part 16 approaches the holding point 26. However, these two holding points are regarded as a single holding point here because of their small distance from each other and their assignment to a common holding point.

FIG. 4 shows that the friction surface 44 is inclined to different degrees on both sides of a latching projection 46. In the area between the vertical 28 and the holding point 26a, the braking force of the shackle drop brake 24 increases only gradually towards the assembly plane, so that the friction surface 44 has a smaller gradient in the direction of the swivel movement 22 than in the area between the holding point 26a and the assembly plane 8. At the latching projection 46, the spring arrangement 36 snaps over as soon as it has passed this tip. After passing the latching projection, the deflection of the spring arrangement 36 or the braking force decreases.

Two advantages can be achieved by positioning a holding point 26a at a point where the connecting part 16 is approximately parallel to the assembly plane or at an acute angle of 30 to it: If the connecting part 16 falls under the influence of gravity in the direction of assembly plane 8, it is braked and held before it strikes assembly plane 8 and may cause injuries to the user in the form of crushing. In addition, damage to the surface of the object 4 is avoided. If the connecting part 16 is moved beyond the holding point 26 or the latching projection 46, so that it rests, for example, on object 2, the resistance on the latching projection 46 must be overcome and the connecting part 16 latched between the holding point 26 or the latching projection 46 and assembly plane 8. This means that, for example, the connecting part 16 can be held firmly pressed against assembly plane 8 in a non-used position so that no annoying rattling noises are generated and it is securely fixed.

As can also be seen in FIG. 4, a further latching structure 45, in particular a latching projection 46, can be provided at a point where the connecting part 16 is in the vertical 28. This latching structure 45 ensures that the connecting part cannot be positioned exactly in the vertical 28 because it snaps around the latching projection 46 present here and is pushed out of the vertical 28 position by the spring arrangement 36. The pushing away from holding point 26b is achieved by the fact that the latching projection 46 has steep flanks 48. Consequently, on the vertical 28, the shackle drop brake 24 forms a deflection point 49 which prevents the connecting part 16 from aligning perpendicularly to assembly plane 8. At holding point 26b, the feature of a latching projection 46 is exploited so that it can be used for braking and holding connecting part 16 as well as for rejecting connecting part 16 due to snap-over.

With reference to FIG. 5 the effect of the latching projection 46 or a steep and a flat inclined flank 48 is shown.

The spring 40 is in a first position together with the shackle 16, in which it presses against a slightly inclined ramp 48 and, as a cut-out, is shown in a second position, snapped over the latching projection 46, opposite the steep ramp 48.

Under the effect of force 50, for example gravity or a manually applied force 50, the spring 40 is increasingly deflected by the flank 48 in the course of the swivel movement until the force 50 is released due to the increasing friction and the correspondingly increasing braking force 52. In addition, the spring can be deformed perpendicular to the swivel movement by the flank 48. For this purpose, the spring is preferably designed to be deflectable perpendicular to the swivel direction. This deformation can generate a restoring force directed against the swivel movement. The more inclined the flank 48 is, the stronger the force with which the deformed spring 40 pushes the connecting part 16 away from the latching projection 46 or holding point 26. After snapping over the latching projection 46, when the spring 40 lies opposite the steeper flank 48, a greater force is generated due to the greater inclination, which pushes the connecting part 16 away from the latching projection 46. After snapping, the braking force decreases abruptly or gradually, depending on how steep the flank 48 is.

In some applications it may be desirable that the connecting part 16 latches into a holding point 26, so that the position of the holding point 26 along the swivel movement is exactly determined by a latching point 56. As FIG. 6 shows, this can be achieved by having a latching recess 54 instead of a latching projection 46 at the latching point 56 as a latching structure 45 interacting with the spring arrangement 36. A latching recess 54 can also be formed between two latching projections 46 adjacent in the swivel direction. The spring arrangement 36 latches into the latching recess 54 at the holding point 26 or latching point 56, so that the connecting part 16 latches into the holding point 26 or latching point 56. This is in contrast to FIG. 5, where the position of the connecting part 16 at holding point 26 depends on the magnitude of the force 50 and in which direction the swiveling movement takes place. The holding point 26 can also be overcome by applying a greater force 50 in the latching arrangement of FIG. 6.

In contrast to a latching projection 46, a latching recess 54 cannot simultaneously serve as a rejection point 49.

The latching recess 54 can also be provided together with a latching projection 46, so that the connecting part 16 is first braked before it latches into a latching recess 54. In such a design, for example, a latching recess 54 is arranged between two latching projections 46.

If the latching recess 54 is longer than the latching part of the spring arrangement 36, the connecting part 16 can move to the end of the latching recess 54 with reduced braking force.

FIGS. 7 and 8 show an embodiment in which a plurality of spring arrangements 26 of the shackle drop brake 24 are located on base part 2. The spring arrangements 26 in this design are designed as resilient pressure pieces 58, here as ball pressure pins. At holding point 26, the spring arrangement 36 on the base part side interacts with the friction surface 44 on the connecting part side. The friction surface 44 can be formed by the leg 38 of the connecting part 16 itself or by a spring 40 attached to the leg 38. With this design, there will also be a snap at every holding point 26. Before holding point 26, the braking force increases and after passing holding point 26, connecting part 16 is pushed away from the holding point. In contrast to the previous embodiment, however, the geometric conditions at each holding point are the same. In the embodiment of FIGS. 7 and 8, the holding point 26b also serves to reject the connecting part 16 from the vertical to the assembly plane 8.

Instead of a connecting part-side spring 40, a rigid latching structure 54 formed by the material of the connecting part 16 or by an element fastened to the connecting part 16, for example a latching projection 46 and/or a latching recess 54, can also be provided.

REFERENCE NUMERALS 1 lifting device
2 base part
4 object
6 bearing surface
8 assembly plane
10 axis of rotation
12 bearings
14 inner bushing
16 connecting part
18 opening or eye
20 swivel axis
22 swivel movement
24 shackle drop brake
25 gap between base part and connecting part
26 holding point
28 vertical on assembly plane
30 acute angle
32 end of connecting part remote from base
34 inhibitor or detent or locking mechanism
36 spring arrangement
38 legs
40 spring
42 bending point of the spring
44 friction surface
45 latching structure
46 latching projection
48 edge of the latching projection
49 rejection point
50 force on connecting part
52 braking force
54 latching recess
56 latching point
58 resilient pressure piece

The invention claimed is:

1. A lifting device comprising:
   a base part for attachment to an object;
   a connecting part held on the base part for attachment of a sling, lifting, lashing or tensioning means, wherein the connecting part is pivotable about a swivel axis relative to the base part and the base part has a bearing surface defining an assembly plane for resting on the object; and
   at least one shackle drop brake which acts between the base part and the connecting part, the at least one shackle drop brake having at least one holding point configured to hold a weight of the connecting part when the connecting part is in a swivel position that is angled with respect to a vertical axis extending from the assembly plane.

2. The lifting device according to claim 1, wherein the at least one shackle drop brake exerts a braking force which increases as the connecting part pivots towards the at least one holding point.

3. The lifting device according to claim 1, wherein the at least one shackle drop brake exerts a braking force that reduces after the connecting part passes the at least one holding point and/or as the connecting part pivots away from the at least one holding point.

4. The lifting device according to claim 1, wherein the at least one shackle drop brake has at least one spring arrangement which is deflected further at the at least one holding point than at one or more points spaced apart from the at least one holding point along a path traversed by the connecting part when pivoting about the swivel axis.

5. The lifting device according to claim 4, wherein the spring arrangement moves with the connecting part or is stationary with the base part.

6. The lifting device according to claim 5, wherein the spring arrangement has a spring which extends at least partially around the connecting part.

7. The lifting device according to claim 5, wherein the spring arrangement is arranged on a side of the base part that is opposite a point at which the at least one holding point engages the connecting part.

8. The lifting device according to claim 1, wherein the at least one shackle drop brake has at least one friction surface which extends, at least in sections, around the swivel axis.

9. The lifting device according to claim 8, wherein the friction surface lies opposite the connecting part.

10. The lifting device according to claim 9, wherein the friction surface has a latching structure aligned with the at least one holding point, the latching structure including at least one of a latching projection and a latching recess.

11. The lifting device according to claim 1, wherein the at least one shackle drop brake is located, at least in sections, in at least one gap between the base part and the connecting part.

12. The lifting device according to claim 1, wherein the at least one shackle drop brake has an inhibitor, a detent, and/or a locking mechanism and the connecting part is held at the at least one holding point in a frictionally locking, positive-locking and/or force-locking manner.

13. The lifting device according to claim 1, wherein the at least one shackle drop brake has a latching point that is arranged at a point at which the connecting part is aligned perpendicularly to the assembly plane.

14. The lifting device according to claim 13, wherein the connecting part snaps around at the latching point.

15. The lifting device according to claim 1, wherein the at least one shackle drop brake performs a snap operation when the connecting part passes the at least one holding point.

* * * * *